(12) United States Patent
Northfield et al.

(10) Patent No.: US 8,318,067 B2
(45) Date of Patent: Nov. 27, 2012

(54) RESIN TRANSFER MOULDING PROCESS FOR AN ARTICLE CONTAINING A PROTECTIVE MEMBER

(75) Inventors: Quinten J. Northfield, Bromley (GB); Robert Lewin, Derby (GB)

(73) Assignee: Rolls-Royce PLC, London (GB)

( * ) Notice: Subject to any disclaimer, the term of this patent is extended or adjusted under 35 U.S.C. 154(b) by 574 days.

(21) Appl. No.: 12/379,226

(22) Filed: Feb. 17, 2009

(65) Prior Publication Data
US 2009/0263614 A1    Oct. 22, 2009

(30) Foreign Application Priority Data

Apr. 21, 2008 (GB) .................................. 0807128.4

(51) Int. Cl.
*B29C 45/14* (2006.01)
*B29C 70/68* (2006.01)
(52) U.S. Cl. ........................................................ 264/258
(58) Field of Classification Search ............ 264/257–258
See application file for complete search history.

(56) References Cited

U.S. PATENT DOCUMENTS

| 4,314,892 A | | 2/1982 | Stevens |
| 4,634,563 A | * | 1/1987 | Hancock ...................... 264/46.7 |
| 5,123,814 A | * | 6/1992 | Burdick et al. ............... 416/224 |
| 5,141,243 A | * | 8/1992 | Meatto .......................... 280/602 |
| 6,283,411 B1 | * | 9/2001 | Giamati et al. ........... 244/134 A |
| 6,926,856 B2 | * | 8/2005 | Hus et al. ....................... 264/257 |
| 7,524,389 B2 | * | 4/2009 | Elbs et al. ..................... 156/242 |
| 2003/0116262 A1 | * | 6/2003 | Stiesdal et al. ............... 156/245 |
| 2005/0001347 A1 | * | 1/2005 | Kralik et al. ................. 264/161 |

FOREIGN PATENT DOCUMENTS

| GB | 885131 | 12/1961 |
| JP | A 7-186199 | 7/1995 |
| JP | A 2007-313835 | 12/2007 |

* cited by examiner

*Primary Examiner* — Jill Heitbrink
(74) *Attorney, Agent, or Firm* — Oliff & Berridge, PLC

(57) ABSTRACT

A resin transfer molding process for an article incorporating a protective insert of polymer material such as polyether ether ketone (PEEK). A piece of PEEK material is cut and thermoformed to the required shape and then placed in position in a mold. A bead of elastomer material is formed around the edge of the insert to seal it against an internal wall of the mold in order to prevent resin tracking between the mold and insert faces during subsequent injection into the mold.

9 Claims, 1 Drawing Sheet

RESIN TRANSFER MOULDING PROCESS FOR AN ARTICLE CONTAINING A PROTECTIVE MEMBER

The invention relates to a resin transfer moulding process for an article containing a protective member.

Articles manufactured from plastics material or composite materials are prone to suffer erosion damage on exposed material surfaces. It is well known to protect such surfaces by attaching protective metallic strips to the most vulnerable surfaces, especially edges. In the case, for example, of an aerofoil member metallic strips are bonded to a leading edge to enable the aerofoil to withstand erosion and impact damage. Normally the strip covers the leading edge itself and typically the margins up to roughly 20% of the chord of the member on both sides of the aerofoil.

Unfortunately a common problem in use is that the protective strips become unstuck and can come off completely causing consequential damage. The present invention seeks to provide a solution to these drawbacks by providing an improved process and materials composition for attaching a surface layer to a member composed of plastics material.

According to one aspect of the invention a resin transfer moulding process for an article containing a protective member comprising a layer of polymer material bonded to or embedded in a surface of the article comprises the steps of: forming the protective member to the shape of the region of the finished article to be protected; placing the shaped member in position in a mould against the surface of the mould; sealing the edges of the polymer member against the mould surface with a bead of elastomeric material; and moulding the article by resin transfer moulding.

According to another aspect of the invention in a resin transfer process for moulding a member or panel containing a protective strip the protective member is formed to the shape of the region of the finished article to be protected by thermoforming a piece of polymer material.

Preferably the polymer material from which the protective member is formed comprises polyether ether ketone.

Figure 2:
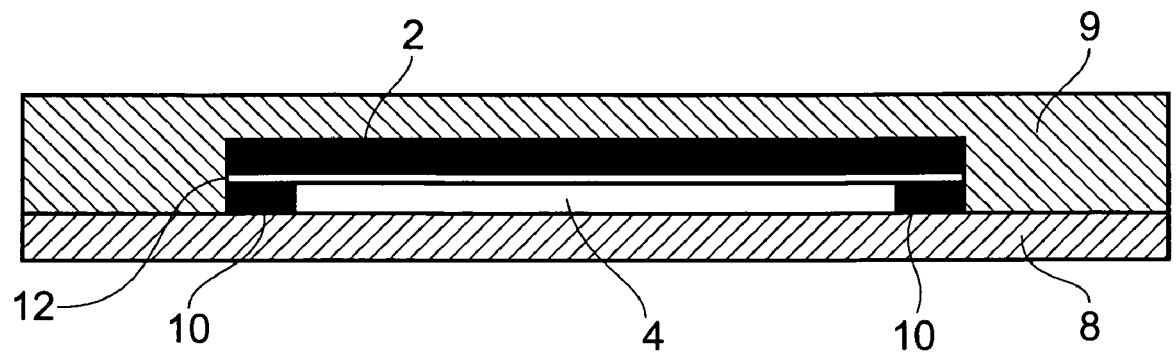
Figure 1:
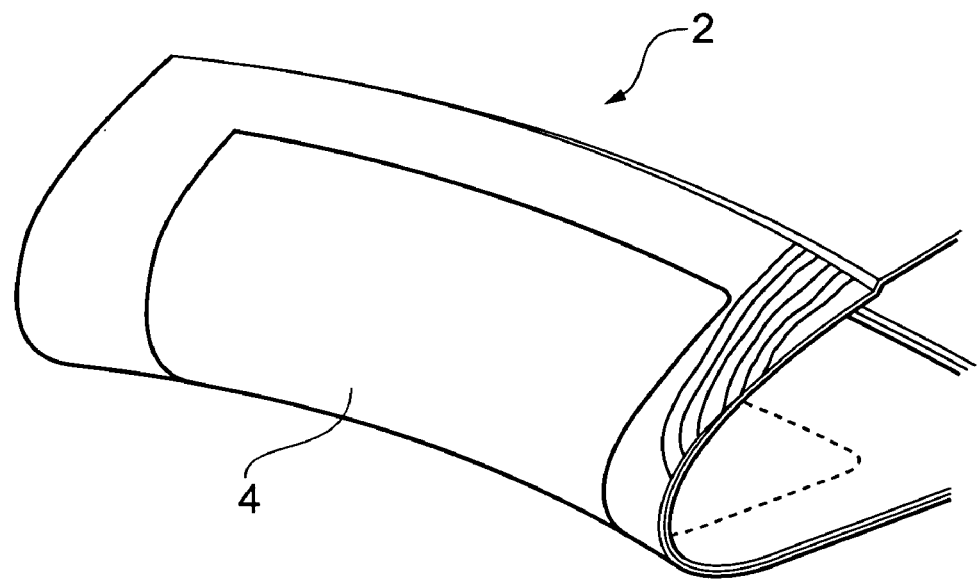

The invention and how it may be carried out in practice will now be described with reference to the accompanying drawings, in which:

FIG. 1 shows a detail cross-section view through a leading edge section of an airfoil component containing a protective layer along the leading edge, and FIG. 2 shows a section through part of a mould loaded with the airfoil component and protective strip as used in the resin transfer moulding process.

It is well known that vulnerable regions, surfaces and edges of articles manufactured of plastics or composite materials can suffer rapid erosion and severe damage from even minor impacts in applications such as aircraft and aero engine components. Protection is commonly provided by means of metallic inserts co-bonded or attached by adhesive in the vulnerable regions. However, metal strips are susceptible to disbonding or delaminating due, for example, to the effects of thermal cycling and differential thermal expansion. If the metal protective strip comes away not only is protection lost, but the strip itself may cause damage. Damage caused by metal strips can be significant and potentially serious.

In comparison to metallic materials strips made of polymer materials have much better adhesion to the plastics or composite materials of the protected component so a polymer protective strip is much less likely to become disbanded in the first instance.

However because the material is also less dense than metal its mass is lower than a metal equivalent so if it does come off it will have a much lower impact and do significantly less damage. In the case of aero engines plastic and composite components are used in cooler rotor sections and towards the front of the engine so detached parts will have less impact on downstream rotors.

The method of the present invention provides a solution to the difficulties of attaching a protective insert made of a plastics material to a component made of plastics or composite materials. A protective strip made of a polymer material eg PEEK or a fabric backed polymer layer will have less stiffness than a composite component so that shear and peel forces that arise during thermal cycling will be much reduced, compared to a metal protective strip on the same component, and therefore much less likely to become disbanded.

Referring now to FIG. 1 there is shown a section through part of the leading edge of an airfoil member 2 made of composite materials and including a protective strip 4 along the leading edge. In accordance with a normal resin transfer moulding process for the manufacture of a composite material article the main structure of the airfoil member 2 comprises multiple layers 6 of carbon fibre fabric laid one over another on a former in the shape of the finished article. This "green" or part-finished component is then placed in a mould and impregnated with resin under pressure to force the resin into the interstices of the fabric layers. The resin is then cured in subsequent process steps which may include the application of heat, depending on the type of materials employed.

Where protection of an edge or surface is required, for example the leading edge of a component exposed in use to a fast flowing airstream so the edge is susceptible to erosion damage, it is known to bond a layer of strip of protective material along the leading edge and in other in vulnerable areas. Usually metal is chosen as the protective strip eg stainless steel, electroplated nickel etc as these offer excellent resistance to erosion and impact damage. Unfortunately for the reason discussed above these metallic strips can become detached during service. If the component is located in a position where the detached strip can impact other parts then significant consequential damage may occur. Therefore it may be preferred to use another less dense material for the protective strip, especially if it also promises better adhesion to the main component.

In accordance with one aspect of the invention such a protective strip for a composite component comprises a strip or sheet of polyether ether ketone [PEEK] compression moulded or thermoformed to the shape of the region or component to be protected which is bonded to or co-cured with the composite component. In a preferred form of the invention the polyether ether ketone [PEEK] strip or sheet is compression moulded together with a piece of fabric 12 of the same material as the component. A flat piece of PEEK is placed in a suitably shaped mould together with the fabric and then subjected to a combination of heat and pressure. It is raised to a temperature below its melting point but high enough that PEEK material flows into the fabric and the two become fused together. Under the influence of heat and pressure the fused strip also takes up the shape of the mould. Compression moulding ensures the PEEK has a good mechanical key to the fabric piece, but without bleeding through the fabric and leaves the reverse side of the fabric uncoated. The PEEK strip is then placed in the component mould together with the "green" component with the uncoated side of the fabric facing towards the outermost of the composite layers. The impregnation and resin cure steps are then carried out and the protective strip and "green" component are co-cured.

Apparatus for carrying out this part of the process is illustrated in FIG. 2, which shows a section through a mould into which a protective strip and "green" component are loaded. The "green component is indicated at 2, the protective strip is shown at 4 and a wall of the mould at 8,9. In accordance with the invention the protective strip 4 is temporarily secured to the mould wall 8 by a bead 10 of elastomeric material, in its "green" state, extending around all of the edges of the strip 4. The bead of elastomeric material provides a boundary between the resin employed in the resin transfer moulding process and the PEEK strip to ensure that the resin is prevented from gaining ingress between the face of the strip 4 and the mould wall 8. Experience has identified fluoroelastomer rubber as suitable for providing a sealing bead. Good results have been obtained using Viton [Registered Trade Mark of the DuPont Corporation] other fluoroelastomer products are available. The elastomer bead also provides protection against erosion of the composite component at the edge of the protective strip.

In summary advantages of the invention are: the bead of elastomeric material seals the edge of the insert strip to the mould wall and prevents resin seeping on to the wrong side of the protective strip, that is between the strip and the mould wall, during the resin transfer process. The elastomeric bead also provides erosion protection at the edge of the strip in the finished component; the elastomer bead provides a smooth transition between the protective strip and the unprotected component surface; the fabric layer provides good mechanical adhesion with the PEEK strip, with the bead of elastomeric material and provides an excellent surface for co-curing with the composite layers of the component.

The invention claimed is:

1. A resin transfer moulding process for an article containing a protective member including a layer of polymer material bonded to or embedded in a surface of the article, the resin transfer moulding process comprising:

shaping the protective member including the layer of polymer material into a shape of a leading edge of an aerofoil to be protected, to form an aerofoil-shaped protective member;

positioning the aerofoil-shaped protective member in a mould against a surface of the mould;

sealing the edges of the aerofoil-shaped protective member against the surface of the mould with a bead of elastomeric material; and moulding the article by resin transfer moulding.

2. The resin transfer moulding process as claimed in claim 1, wherein the protective member is formed to the shape of the leading edge of an aerofoil to be protected by thermoforming a piece of polymer material.

3. The resin transfer moulding process as claimed in claim 1, wherein the protective member is formed together with a layer of reinforcing fabric on an inner side in the moulded article.

4. The resin transfer moulding process as claimed in claim 1, wherein the polymer material is polyether ether ketone.

5. The resin transfer moulding process as claimed in claim 1, wherein the elastomeric material is selected from a range of elastomeric materials including fluoroelastomers.

6. The resin transfer moulding process as claimed in claim 1, wherein the step of moulding the article by resin transfer moulding includes the steps of placing a composite aerofoil against the aerofoil-shaped protective member in the mould, impregnating the composite aerofoil and the aerofoil-shaped protective member with resin, and co-curing the composite aerofoil and the aerofoil-shaped protective member.

7. The resin transfer moulding process as claimed in claim 6, wherein the aerofoil-shaped protective member is formed together with a layer of reinforcing fabric before the composite aerofoil is placed against the aerofoil-shaped protective member.

8. The resin transfer moulding process as claimed in claim 7, wherein the layer of reinforcing fabric is compression moulded to the aerofoil-shaped protective member.

9. The resin transfer moulding process as claimed in claim 6, wherein the aerofoil-shaped protective member is formed in a shape of a leading edge of the composite aerofoil.

\* \* \* \* \*